(12) United States Patent
Song et al.

(10) Patent No.: US 11,417,078 B2
(45) Date of Patent: Aug. 16, 2022

(54) IMAGE PROCESSING METHOD AND APPARATUS, AND STORAGE MEDIUM

(71) Applicant: Beijing Sensetime Technology Development Co., Ltd., Beijing (CN)

(72) Inventors: Guanglu Song, Beijing (CN); Yu Liu, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/998,285

(22) Filed: Aug. 20, 2020

(65) Prior Publication Data
US 2021/0241015 A1 Aug. 5, 2021

Related U.S. Application Data

(63) Continuation of application No. PCT/CN2020/081376, filed on Mar. 26, 2020.

(30) Foreign Application Priority Data

Feb. 3, 2020 (CN) .......................... 202010078672.X

(51) Int. Cl.
*G06V 10/25* (2022.01)
*G06K 9/62* (2022.01)
*G06V 10/50* (2022.01)
*G06V 40/10* (2022.01)
*G06V 40/16* (2022.01)

(52) U.S. Cl.
CPC ........... *G06V 10/25* (2022.01); *G06K 9/6256* (2013.01); *G06V 10/50* (2022.01); *G06V 40/103* (2022.01); *G06V 40/107* (2022.01); *G06V 40/161* (2022.01)

(58) Field of Classification Search
CPC ........... G06K 9/00375; G06K 9/00228; G06K 9/6256; G06K 9/00369; G06K 9/4642; G06K 9/3233
See application file for complete search history.

(56) References Cited

U.S. PATENT DOCUMENTS

| | | | |
|---|---|---|---|
| 10,007,841 B2 * | 6/2018 | Chen | G06V 10/24 |
| 2017/0344808 A1 * | 11/2017 | El-Khamy | G06K 9/00228 |
| 2019/0138792 A1 * | 5/2019 | Suh | G06K 9/00248 |

FOREIGN PATENT DOCUMENTS

| | | |
|---|---|---|
| CN | 110348358 A | 10/2019 |
| CN | 110472554 A | 11/2019 |
| CN | 110738192 A | 1/2020 |
| JP | 2014-215751 A | 11/2014 |
| WO | WO 2019/137137 A1 | 7/2019 |
| WO | WO 2020/010979 A1 | 1/2020 |

* cited by examiner

*Primary Examiner* — Pinalben Patel
(74) *Attorney, Agent, or Firm* — BakerHostetler

(57) ABSTRACT

The present disclosure relates to an image processing method and apparatus, an electronic device, and a storage medium. The method includes: performing feature extraction on a to-be-processed image to obtain a first feature map of the to-be-processed image; performing target region prediction on the first feature map to determine a first region where a target is located in the first feature map; and performing key point detection on the first feature map according to the first region to determine target key point information of the to-be-processed image. According to embodiments of the present disclosure, quick and accurate target key point detection can be implemented.

20 Claims, 5 Drawing Sheets

IMAGE PROCESSING METHOD AND APPARATUS, AND STORAGE MEDIUM

The present application is a bypass continuation of and claims priority under 35 U.S.C. § 111(a) to PCT Application. No. PCT/CN2020/081376, filed on Mar. 26, 2020, which claims priority to Chinese Patent Application No. 202010078672.X, filed with the Chinese Patent Office on Feb. 3, 2020 and entitled "IMAGE PROCESSING METHOD AND APPARATUS, ELECTRONIC DEVICE, AND STORAGE MEDIUM", which is incorporated herein by reference in its entirety.

TECHNICAL FIELD

The present disclosure relates to the field of computer technologies, and in particular, to an image processing method and apparatus, an electronic device, and a storage medium.

BACKGROUND

In the fields such as computer vision and target recognition, detection generally needs to be performed on a target (e.g., a face) in an image.

SUMMARY

The present disclosure provides technical solutions for image processing.

According to one aspect of the present disclosure, provided is an image processing method, including: performing feature extraction on a to-be-processed image to obtain a first feature map of the to-be-processed image; performing target region prediction on the first feature map to determine a first region where a target is located in the first feature map; and performing key point detection on the first feature map according to the first region to determine target key point information of the to-be-processed image.

In one possible implementation, the method further includes: performing bounding box regression on the target key point information of each target in the to-be-processed image respectively to determine a second region of the each target; and determining a target recognition result of the to-be-processed image according to the second region of the each target. In one possible implementation, performing target region prediction on the first feature map to determine the first region where the target is located in the first feature map includes: performing center point feature extraction on the first feature map to obtain a second feature map; determining at least one region center point from a plurality of feature points of the second feature map, where the region center point includes a feature point having a feature value greater than or equal to a first threshold; determining a scale of the first region corresponding to each region center point according to a channel number corresponding to the each region center point in the at least one region center point; and determining each first region respectively according to a position of the each region center point and the scale of the first region corresponding to the each region center point.

In one possible implementation, performing key point detection on the first feature map according to the first region to determine the target key point information of the to-be-processed image includes: performing key point feature extraction on the first feature map to obtain a third feature map; determining a plurality of key points of the target from a feature region corresponding to the first region in the third feature map; and determining the target key point information of the to-be-processed image according to positions of the plurality of key points in the third feature map.

In one possible implementation, determining the plurality of key points of the target from the feature region corresponding to the first region in the third feature map includes: performing key point detection on channels of the feature region respectively to obtain key points corresponding to the channels.

In one possible implementation, determining the target recognition result of the to-be-processed image according to the second region of the each target includes: determining a first confidence score of the first region corresponding to the second region, and a second confidence score of all or part of the target key point information of the second region; determining a third confidence score of the second region according to the first confidence score and the second confidence score; and determining the target recognition result of the to-be-processed image according to the third confidence score of each second region, where the target recognition result includes the second region having the third confidence score greater than or equal to a second threshold.

In one possible implementation, the method is implemented via a neural network, and the method further includes: training the neural network according to a preset training set, where the training set includes a plurality of sample images, region labeling information in the plurality of sample images, and key point labeling information in the plurality of sample images.

In one possible implementation, the neural network includes a feature extraction network, a region prediction network, and a key point detection network, and training the neural network according to the preset training set includes: processing the sample images via the feature extraction network to determine a first sample feature map; processing the first sample feature map via the region prediction network to determine a second sample feature map and at least one sample region in the second sample feature map; processing the first sample feature map via the key point detection network to determine a third sample feature map, where a width and a height of the third sample feature map are identical to a width and a height of the second sample feature map; determining sample key point information in the sample region of the third sample feature map according to the at least one sample region; determining a first labeling feature map of the sample images according to the region labeling information of the sample images, where a scale of the first labeling feature map is identical to a scale of the second sample feature map, and a channel number of the first labeling feature map represents a scale of the region labeling information; determining a first loss of the sample images for the region prediction network according to a difference between the first labeling feature map and the second sample feature map; determining a second loss of the sample images for the key point detection network according to a difference between the key point labeling information and the sample key point information; and training the neural network according to the first loss and the second loss of the plurality of sample images.

In one possible implementation, the target in the to-be-processed image includes any one of a face, a body, or hands.

According to one aspect of the present disclosure, provided is an image processing apparatus, including: a feature extraction module, configured to perform feature extraction on a to-be-processed image to obtain a first feature map of the to-be-processed image; a region prediction module, configured to perform target region prediction on the first feature map to determine a first region where a target is located in the first feature map; and a key point detection module, configured to perform key point detection on the first feature map according to the first region to determine target key point information of the to-be-processed image.

In one possible implementation, the apparatus further includes: a bounding box regression module, configured to perform bounding box regression on the target key point information of each target in the to-be-processed image respectively to determine a second region of the each target; and a result determination module, configured to determine a target recognition result of the to-be-processed image according to the second region of the each target.

In one possible implementation, the region prediction module includes: a center point feature extraction sub-module, configured to perform center point feature extraction on the first feature map to obtain a second feature map; a center point determination sub-module, configured to determine at least one region center point from a plurality of feature points of the second feature map, where the region center point includes a feature point having a feature value greater than or equal to a first threshold; a scale determination sub-module, configured to determine a scale of the first region corresponding to each region center point according to a channel number corresponding to the each region center point in the at least one region center point; and a region determination sub-module, configured determine each first region respectively according to a position of the each region center point and the scale of the first region corresponding to the each region center point.

In one possible implementation, the key point detection module includes: a key point feature extraction sub-module, configured to perform key point feature extraction on the first feature map to obtain a third feature map; a key point determination sub-module, configured to determine a plurality of key points of the target from a feature region corresponding to the first region in the third feature map; and a key point information determining sub-module, configured to determine the target key point information of the to-be-processed image according to positions of the plurality of key points in the third feature map.

In one possible implementation, the key point determination sub-module is configured to perform key point detection on channels of the feature region respectively to obtain key points corresponding to the channels.

In one possible implementation, the result determination module includes: a first score determination sub-module, configured to determine a first confidence score of the first region corresponding to the second region, and a second confidence score of all or part of the target key point information of the second region; a second score determination sub-module, configured to determine a third confidence score of the second region according to the first confidence score and the second confidence score; and a result determination sub-module, configured to determine the target recognition result of the to-be-processed image according to the third confidence score of each second region, where the target recognition result includes the second region having the third confidence score greater than or equal to a second threshold.

In one possible implementation, the apparatus is implemented via a neural network, and the apparatus further includes: a training module, configured to train the neural network according to a preset training set, where the training set includes a plurality of sample images, region labeling information in the plurality of sample images, and key point labeling information in the plurality of sample images.

In one possible implementation, the neural network includes a feature extraction network, a region prediction network, and a key point detection network, and the training module is configured to:

process the sample images via the feature extraction network to determine a first sample feature map; process the first sample feature map via the region prediction network to determine a second sample feature map and at least one sample region in the second sample feature map; process the first sample feature map via the key point detection network to determine a third sample feature map, where a width and a height of the third sample feature map are identical to a width and a height of the second sample feature map; determine sample key point information in the sample region of the third sample feature map according to the at least one sample region; determine a first labeling feature map of the sample images according to the region labeling information of the sample images, where a scale of the first labeling feature map is identical to a scale of the second sample feature map, and a channel number of the first labeling feature map represents a scale of the region labeling information; determine a first loss of the sample images for the region prediction network according to a difference between the first labeling feature map and the second sample feature map; determine a second loss of the sample images for the key point detection network according to a difference between the key point labeling information and the sample key point information; and train the neural network according to the first loss and the second loss of the plurality of sample images.

In one possible implementation, the target in the to-be-processed image includes any one of a face, a body, or hands.

According to one aspect of the present disclosure, provided is an electronic device, including: a processor; and a memory configured to store processor-executable instructions, where the processor is configured to invoke the instructions stored in the memory to implement the foregoing method.

According to one aspect of the present disclosure, provided is a computer-readable storage medium, having computer program instructions stored thereon, where when the computer program instructions are executed by a processor, the foregoing method is implemented.

According to one aspect of the present disclosure, provided is a computer program, including a computer-readable code, where when the computer-readable code runs in an electronic device, a processor in the electronic device implements the foregoing method.

In embodiments of the present disclosure, a feature map of a to-be-processed image is obtained, a region where a target is located in the feature map is predicted, and then key point detection is performed on a region where the target is located to determine target key point information of the image, so as to improve a detection speed and a detection effect, thereby implementing quick and accurate target key point detection.

It should be understood that the foregoing general descriptions and the following detailed descriptions are merely exemplary and explanatory, but are not intended to limit the present disclosure. Exemplary embodiments are described in detail below according to the following reference accompanying drawings, and other features and aspects of the present disclosure become clear.

BRIEF DESCRIPTION OF THE DRAWINGS

The accompanying drawings herein are incorporated into the specification and constitute a part of the specification. These accompanying drawings show embodiments that conform to the present disclosure, and are intended to describe the technical solutions in the present disclosure together with the specification.

DETAILED DESCRIPTION

Figure 1:
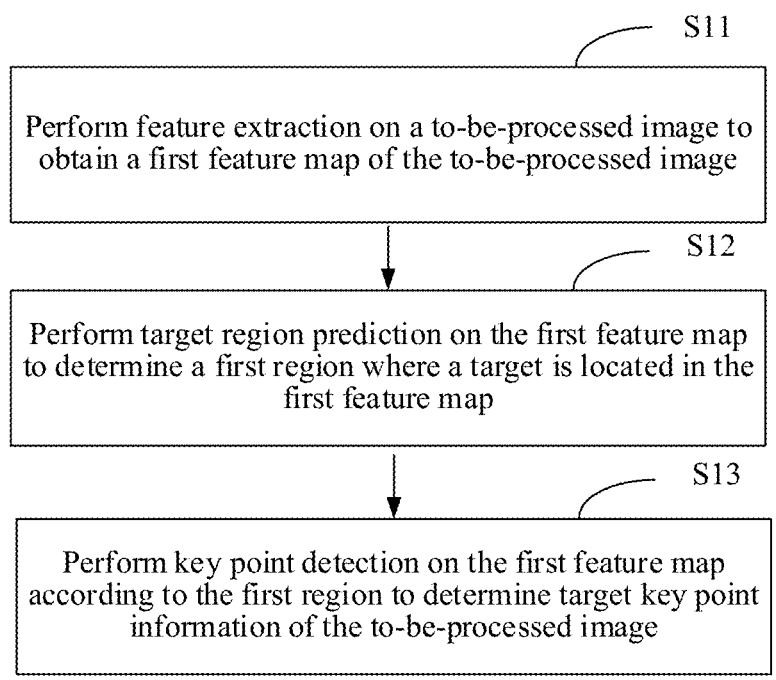
FIG. 1 shows a flowchart of an image processing method according to embodiments of the present disclosure.

The following describes various exemplary embodiments, features, and aspects of the present disclosure in detail with reference to the accompanying drawings. Same reference numerals in the accompanying drawings represent elements with same or similar functions. Although various aspects of the embodiments are shown in the accompanying drawings, the accompanying drawings are not necessarily drawn in proportion unless otherwise specified.

The special term "exemplary" herein means "used as examples, embodiments, or descriptions". Any embodiment herein described by the term "exemplary" should not be explained as being more superior or better than other embodiments.

The term "and/or" herein describes only an association relationship describing associated objects and indicates that three relationships may exist. For example, A and/or B may indicate the following three cases: only A exists, both A and B exist, and only B exists. In addition, the term "at least one" herein indicates any one of multiple elements or any combination of at least two of multiple elements. For example, including at least one of A, B, or C may indicate including any one or more elements selected from a set consisting of A, B, and C.

In addition, to better describe the present disclosure, numerous specific details are given in the following specific implementations. A person skilled in the art should understand that the present disclosure may also be implemented without some of the specific details. In some samples, methods, means, elements, and circuits well known to a person skilled in the art are not described in detail so as to highlight the subject matter of the present disclosure.

FIG. 1 shows a flowchart of an image processing method according to embodiments of the present disclosure. As shown in FIG. 1, the method includes the following steps.

In step S11, feature extraction is performed on a to-be-processed image to obtain a first feature map of the to-be-processed image.

In step S12, target region prediction is performed on the first feature map to determine a first region where a target is located in the first feature map.

In step S13, key point detection is performed on the first feature map according to the first region to determine target key point information of the to-be-processed image.

In one possible implementation, the image processing method may be implemented by an electronic device such as a terminal device or a server. The terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, or the like. The method may be implemented by a processor by invoking computer-readable instructions stored in a memory. Alternatively, the method may be implemented by a server.

For example, in an application scenario such as face unlocking, security monitoring, or an access control gate, detection needs to be performed on a target in a to-be-processed image. The to-be-processed image may be an image acquired by an image acquisition device (e.g., a camera), and a target to be recognized may exist in the to-be-processed image, where the target may include, for example, any one of a face, a body, or hands. The present disclosure does not limit a type of the application scenario, a mode for acquiring the to-be-processed image, and a type of the target.

In one possible implementation, in step S11, feature extraction is performed on the to-be-processed image through a lightweight detector to obtain the first feature map of the to-be-processed image, so as to reduce the scale of the image. The detector may be, for example, a convolutional neural network, and no limitation is made thereto in the present disclosure.

In one possible implementation, in step S12, target region prediction is performed on the first feature map to obtain a position of a region where the target may exist in the first feature map and a scale of the region, and a scale region suggestion box, i.e., the first region where the target is located, is given.

In one possible implementation, after the first region is obtained, in step S13, key point detection is performed on the first feature map according to the first region to obtain the position of a target key point in each first region, for example, when the target is a face, positions of key points such as eyes, a nose and a mouth of the face are obtained, so as to determine the target key point information of the to-be-processed image.

According to the embodiments of the present disclosure, a feature map of a to-be-processed image is obtained, a region where a target is located in the feature map is predicted, a region suggestion box is given, and then key point detection is performed on the region suggestion box to determine target key point information of the image, so as to improve a detection speed and a detection effect, thereby implementing quick and accurate target key point detection.

In one possible implementation, feature extraction is performed on the to-be-processed image through a lightweight detector (which may be referred to as a feature extraction network). The feature extraction network may be a convolutional neural network (referred to as ConvNet).

Figure 2:
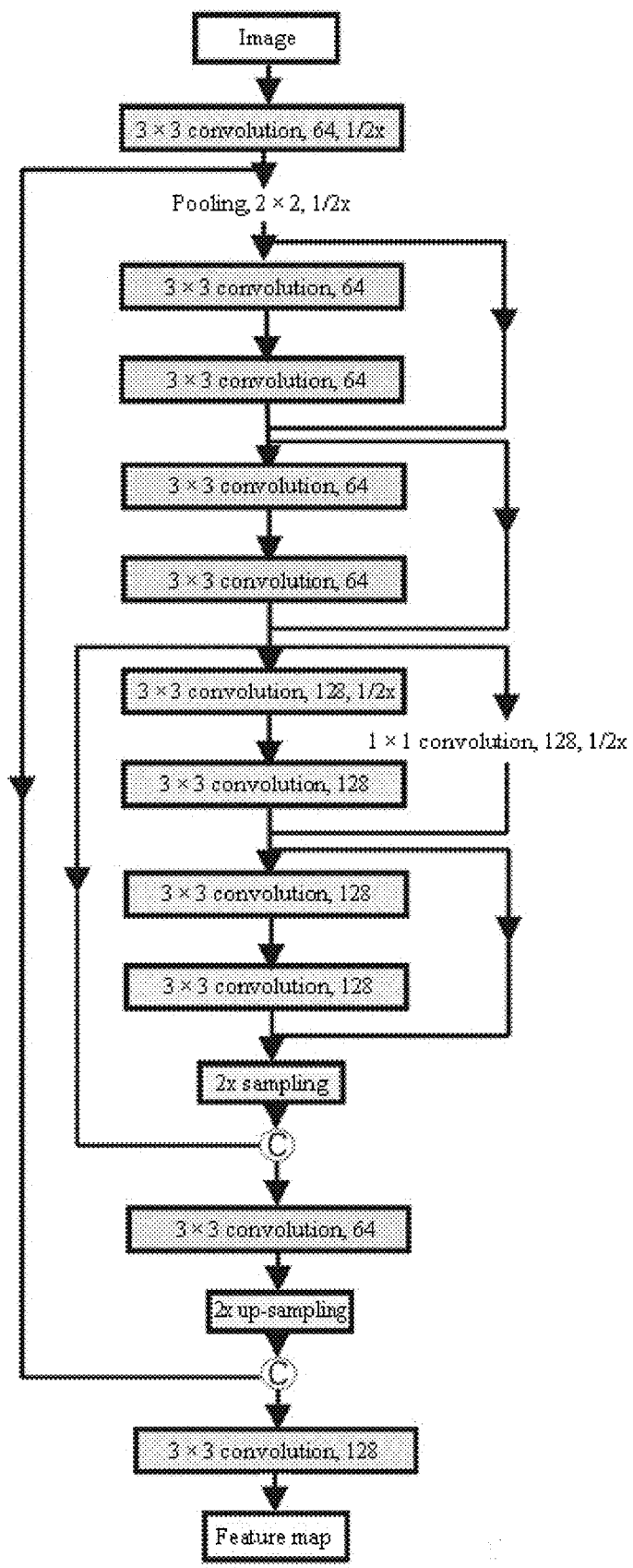
FIG. 2 shows a schematic diagram of a feature extraction network according to embodiments of the present disclosure.

FIG. 2 shows a schematic diagram of a feature extraction network according to embodiments of the present disclosure. As shown in FIG. 2, the feature extraction network includes a plurality of convolutional layers, a pooling layer, an up-sampling layer and a fully connected layer, etc. A convolution (conv) operation (a size of a convolution kernel is 3×3, a number of channels is 64, and a sampling multiple is ½ (i.e., a down-sampling multiple is 2)) is performed on an image (i.e., a to-be-processed image) to obtain a first operation result (not shown); a pooling operation (the size is 2×2, and the sampling multiple is ½), a plurality of convolution operations (the size of the convolution kernel is 3×3 and the number of channels is 64), and feature fusion (i.e., superposition) are performed on the first operation result to obtain a second operation result (not shown); a plurality of convolution operations (the size of the convolution kernel is 3×3, the number of channels is 128, and the sampling multiple is ½ or 1) and feature fusion are performed on the second operation to obtain a third operation result (not shown); after the third operation result is subjected to two times of up-sampling, connection to the second operation result (C represents a full connection operation), convolution (the size of the convolution kernel is 3×3 and the number of channels is 64), two times of up-sampling, connection to the first operation result, and convolution (the size of the convolution kernel is 3×3 and the number of channels is 128), a final feature map (i.e., a first feature map of the to-be-processed image) is obtained.

In one possible implementation, a scale of the to-be-processed image input to the feature extraction network is 256×256, and the to-be-processed image of the scale is obtained by performing preprocessing on an acquired image. The down-sampling multiple of the entire feature extraction network is 2, and thus after processing via the feature extraction network, the first feature map having the scale of 128×128 is obtained. Features of the to-be-processed image are quickly extracted via the lightweight feature extraction network, and the feature map of a low scale is obtained, thus providing a basis for subsequent processing.

In one possible implementation, in step S12, target region prediction is performed on the first feature map. Step S12 includes:

performing center point feature extraction on the first feature map to obtain a second feature map;

determining at least one region center point from a plurality of feature points of the second feature map, where the region center point includes a feature point having a feature value greater than or equal to a first threshold;

determining a scale of the first region corresponding to each region center point according to a channel number corresponding to the each region center point in the at least one region center point; and determining each first region respectively according to a position of the each region center point and the scale of the first region corresponding to the each region center point.

For example, a center point feature of the first feature map is extracted via a convolutional neural network to obtain a second feature map (also referred to as a fine-grained scale estimation feature map), where a scale of the second feature map is H×W×G, H, W and G represent a height, a width and a number of channels of the second feature map, respectively, and the number of channels, G, is, for example, 60. The second feature map includes a plurality of feature points, a feature value of any feature point indicates a probability or confidence of the feature point being a region center point of a region where the target is located, and when the number of the channel where the feature point is located indicates a scale (a height and a width) of the corresponding region when the feature point is the region center point.

In one possible implementation, the first threshold is preset, the feature point having a feature value greater than or equal to the first threshold is determined as the region center point of the region where the target is located. Thus, one or more region center points are determined in the plurality of feature points of the second feature map. The specific value of the first threshold is not limited in the present disclosure.

In one possible implementation, after the region center point in the second feature map is determined, according to the channel number corresponding to the each region center point in the one or more region center points, the scale of the first region corresponding to the each region center point is determined; and then according to the position of the each region center point and the scale of the first region corresponding to the each region center point, the each first region is determined respectively, that is, one or more region suggestion boxes are estimated.

For example, coordinates of a certain region center point A in the second feature map is ($|x_v/N_s|$, $|y_v/N_s|$, by), where $N_s$ represents a down-sampling multiple of the second feature map with respect to the first feature map, and $b_v$ represents the channel number, then a position of the region center point A in the first feature map is ($x_v$, $y_v$), a height and a width of the first region corresponding to the region center point A are both the scale $s_v$ corresponding to the channel number $b_v$, and the first region corresponding to the region center point A is represented as [$x_v$, $y_v$, $s_v$, $s_v$]. It should be understood that a person skilled in the art may set a correspondence between the channel number and the scale according to actual situations, and no limitation is made thereto in the present disclosure.

In this way, a position where a target may exist in an image and a scale thereof are predicted, and a region suggestion box of the region where the target is located is obtained, so as to perform key point detection in subsequent processing, thereby improving a detection effect.

In one possible implementation, after the first region is obtained, in step S13, key point detection is performed on the first feature map. Step S13 includes:

performing key point feature extraction on the first feature map to obtain a third feature map;

determining a plurality of key points of the target from a feature region corresponding to the first region in the third feature map; and determining target key point information of the to-be-processed image according to positions of the plurality of key points in the third feature map.

For example, key point features of the first feature map are extracted via a convolutional neural network to obtain a third feature map (also referred to as a key point response feature map), where a scale of the third feature map is H×W×K, H, and W and K represent a height, a width and a number of channels of the third feature map, respectively. The height and the width of the third feature map are identical to the height and the width of the second feature map, the number of channels, K, is used for representing a number of key points of each target, for example, the number of channels, K, being 5. The specific value of the number of channels, K, is not limited in the present disclosure.

In one possible implementation, according to the first region (i.e., the region suggestion box) determined in the foregoing step, a plurality of key points of the target in the feature region corresponding to the first region are determined, for example, when the target is a face, key points corresponding to eyes, a nose, a mouth, etc., are determined.

In one possible implementation, determining the plurality of key points of the target from the feature region corresponding to the first region in the third feature map includes:

performing key point detection on channels of the feature region respectively to obtain key points corresponding to the channels.

For example, for any feature region $R[x_1, y_1, x_2, y_2]$, $(x_1, y_1)$ and $(x_2, y_2)$ represent coordinates of a upper left vertex and a lower right vertex of a region R, respectively, and normalization is first performed on the third feature map (for example, normalization is performed by using a softmax function). For any one feature point $h_{i,j,c}$ in the feature region R, the feature value obtained after the normalization is represented as:

$$\Phi(h_{i,j,c}) = \begin{cases} \dfrac{e^{h_{i,j,c}}}{\sum\limits_{m=x_1}^{x_2}\sum\limits_{m=y_1}^{y_2} e^{h_{m,n,c}}}, & (i,j) \in R \\ 0, & \text{others} \end{cases} \quad (1)$$

In formula (1), i and j represent an abscissa and an ordinate of a feature point, respectively, and c represents a channel number of the feature point, where $1 \leq c \leq K$; $h_{m,n,c}$ represents any feature point in a same channel as $h_{i,j,c}$, where $x_1 \leq m \leq x_2$ and $y_1 \leq n \leq y_2$.

After the feature value of each feature point in the feature region R is obtained, an abscissa and an ordinate of a key point on channel c of the region is calculated: $P_c = (\Psi_{c,x}, \Psi_{c,y})$:

$$\Psi_{c,x} = \sum_{i=1}^{W}\sum_{j=1}^{H} \dfrac{\mathbb{P}(i-x_1, w_1)}{w_1} \Phi(h_{i,j,c}) \quad (2)$$

$$\Psi_{c,y} = \sum_{i=1}^{W}\sum_{j=1}^{H} \dfrac{\mathbb{P}(j-y_1, h_1)}{h_1} \Phi(h_{i,j,c})$$

In formula (2), $w_1$ and $h_1$ represent a width and a height of the feature region R, respectively; for function $\mathbb{P}(p,q)$, if $0 \leq p \leq q$, p is returned, or otherwise, 0 is returned.

The processing process of formulas (1) and (2) is referred to as a soft-argmax operation, that is, in combination with an index normalization function softmax, the purpose of argmax (searching for the index of the maximum value of a parameter) is achieved, and the process is derivable.

In this way, calculation is performed on K channels of the feature region R, respectively, so that K feature points on the K channels of the feature region R are obtained; and then all feature regions in the third feature map are processed, the K feature points in each feature region are obtained. The target key point information of the to-be-processed image is determined according to positions of the K feature points in the each feature region of the third feature map and a correspondence between the third feature map and the to-be-processed image.

In this way, the key points of the target are generated according to the region suggestion box and the key point response feature map and in combination with a scale adaptive soft-argmax operation, so that the effect of key point detection is improved, without being limited by the number of key points.

In one possible implementation, the method further includes:

performing bounding box regression on the target key point information of each target in the to-be-processed image respectively to determine a second region of the each target; and determining a target recognition result of the to-be-processed image according to the second region of the each target.

For example, after the target key point is obtained in step S13, bounding box regression is performed on the target key point information of the each target to obtain the second region where the target is located, so that the range of the region is more accurate.

In one possible implementation, statistics about average target key point coordinates $(\bar{x}, \bar{y})$ of a plurality of images (for example, a plurality of sample images in a training step) are collected:

$$\begin{cases} \bar{x} = \dfrac{1}{N}\sum\limits_{l=1}^{N} \dfrac{x_l}{w_l} \\ \bar{y} = \dfrac{1}{N}\sum\limits_{l=1}^{N} \dfrac{y_l}{h_l} \end{cases} \quad (3)$$

In formula (3), N represents a number of label boxes in images involved in the statistics, for example, N=10,000; $(x_l, y_l)$ may represent target key point coordinates in any label box; and $w_l$ and $h_l$ represent a width and a height of a corresponding face label box, where $1 \leq l \leq N$. For face key point information in a data set, corresponding average point coordinates $(\bar{x}_k, \bar{y}_k)$ of each key point are calculated, where and $1 \leq k \leq K$ is the number of key points. Thus, for a group of target key points obtained through detection and a corresponding transformation matrix T, the following formula is provided:

$$\begin{bmatrix} \bar{x}_1 & \bar{x}_2 & \bar{x}_3 \\ \bar{y}_1 & \bar{y}_2 & \bar{y}_3 \\ 1 & 1 & 1 \end{bmatrix}^T = \begin{bmatrix} X_1 & X_2 & X_3 \\ Y_1 & Y_2 & Y_3 \\ 1 & 1 & 1 \end{bmatrix}^T T \quad (4)$$

In formula (4), $(\bar{x}_1, \bar{y}_1)$, $(\bar{x}_2, \bar{y}_2)$, and $(\bar{x}_3, \bar{y}_3)$ represent average point coordinates of any three key points, and $(X_1, Y_1)$, $(X_2, Y_2)$, and $(X_3, Y_3)$ represent three corresponding target key points in a group of target key points. In formula (4), the transformation matrix T corresponding to the group of target key points is calculated. Assuming that the upper left vertex and the lower right vertex of a bounding box corresponding to the group of target key points are $(x_3, y_3)$ and $(x_4, y_4)$, respectively, the following formula is provided:

$$\begin{bmatrix} x_3 & x_4 \\ y_3 & y_4 \\ 1 & 1 \end{bmatrix}^T = \begin{bmatrix} 0 & 1 \\ 0 & 1 \\ 1 & 1 \end{bmatrix}^T T^{-1} \quad (5)$$

In formula (5), the coordinates $(x_3, y_3)$ and $(x_4, y_4)$ of the upper left vertex and the lower right vertex of the bounding box corresponding to the group of target key points are calculated, that is, the second region where the target is located is obtained by means of bounding box regression. Thus, by performing bounding box regression processing on the target key point of the each target in the to-be-processed image, the second region of the each target is determined; and then the target recognition result of the to-be-processed image is determined according to the second region of the each target.

In this way, by performing bounding box regression on the detected target key point, the influence on fuzzy definition of the bounding box can be effectively reduced, and the obtained position of the region where the target is located is more accurate.

In one possible implementation, the step of determining the target recognition result of the to-be-processed image according to the second region of the each target includes:

determining a first confidence score of the first region corresponding to the second region, and a second confidence score of all or part of the target key point information of the second region;

determining a third confidence score of the second region according to the first confidence score and the second confidence score; and determining the target recognition result of the to-be-processed image according to the third confidence score of each second region, where the target recognition result includes the second region having the third confidence score greater than or equal to a second threshold.

For example, after the second region of the each target in the to-be-processed image is obtained, the confidence score of the each second region is determined, for representing a probability of the second region being the region where a real target is located.

In one possible implementation, for any one second region, the first confidence score of the first region (i.e., the region suggestion box) corresponding to the second region is determined, where the first confidence score may be a feature value of the region center point of the first region, or correspond to the feature value of the region center point. Moreover, a second confidence score of all or part of the target key point information of the second region is determined, that is, calculation may be performed by using all of the target key points, or calculation may be performed by using some of important target key points, and no limitation is made thereto in the present disclosure.

In one possible implementation, a third confidence score of the second region is determined according to the first confidence score and the second confidence score. For any one second region, assuming that the first confidence score of the second region is $P_1$, the second confidence score is a sum of the feature values of three important target key points, and the third confidence score is $P_3$, the following formula is provided:

$$P_3 = P_0 + \Sigma_{c=1}^{3} \max(\Phi(h_{*,*,c})) \quad (6)$$

In formula (6), $\Phi(h_{*,*,c})$ represents the feature value of any one point $h_{*,*,c}$ in the second region, $\max(\Phi(h_{*,*,c}))$ represents the feature value of the target key point, and c is the channel number.

In one possible implementation, a second threshold for the confidence score is preset. If the third confidence score of the second region is greater than or equal to the second threshold, it is considered that the second region is the region where the real target is located, and may be taken as a target recognition result; otherwise, if the third confidence score of the second region is smaller than the second threshold, it is considered that the second region is not the region where the real target is located, and is removed from the target recognition result. The specific value of the second threshold is not limited in the present disclosure.

In this way, filtrating is performed on the region where the target is located obtained by means of bounding box regression, and thus the precision of target recognition in images is further improved.

In one possible implementation, the image processing method according to the embodiments of the present disclosure is implemented via a neural network, where the neural network includes a feature extraction network, a region prediction network, and a key point detection network, which are used for feature extraction, target region prediction, and key point detection, respectively.

Figure 3:
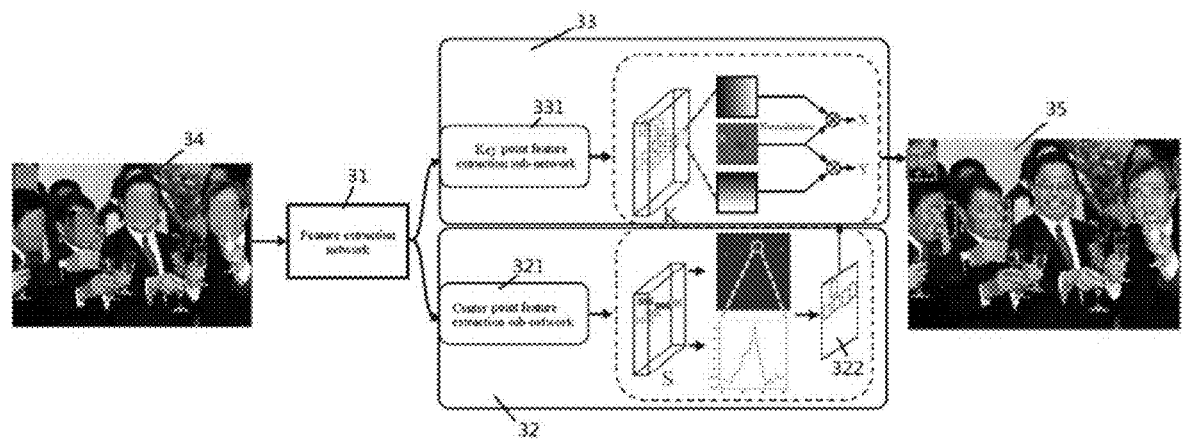
FIG. 3 shows a schematic diagram of an image processing process according to embodiments of the present disclosure.

FIG. 3 shows a schematic diagram of an image processing process according to embodiments of the present disclosure. As shown in FIG. 3. A neural network includes a feature extraction network 31, a region prediction network 32, and a key point detection network 33. A to-be-processed image 34 is input to the feature extraction network 31 for processing to obtain a first feature map (not shown) of the to-be-processed image 34, so as to reduce the scale of the image.

In the example, the first feature map is input to a center point feature extraction sub-network 321 of the region prediction network 32 for processing to obtain a second feature map (also referred to as a fine-grained scale estimation feature map) S having a scale of H×W×G; the feature point having a feature value greater than or equal to a first threshold is selected from the feature values of feature points in each channel, and the scale of the region is determined according to the channel where the region center point is located, so as to obtain a plurality of first regions (i.e., the region suggestion boxes) 322.

In the example, the first feature map may be simultaneously input to a key point feature extraction sub-network 331 of the key point detection network 33 for processing to obtain a third feature map (also referred to as a key point response feature map) K, where the scale of the third feature map is H×W×K; according to the first region 322 determined in the foregoing step, softmax normalization is performed on the feature points in feature regions corresponding to the first regions, so as to determine a plurality of key points (each channel corresponds to a type of key points) of the target, and the coordinates are represented as (X, Y).

In the example, bounding box regression is performed according to the plurality of key points of each target to determine a more accurate target region (referred to as a second region). After filtrating, a target recognition result 35 of the to-be-processed image is finally obtained. The target recognition result 35 includes a bounding box where each recognized target is located and positions of the key points. In a situation where the target is a face, a plurality of face bounding boxes and positions of key points such as eyes, a nose, a mouth, etc. in the face bounding boxes are obtained.

In one possible implementation, before the neural network of the image processing method according to the embodiments of the present disclosure is applied, the neural network is trained. The method further includes:

training the neural network according to a preset training set, where the training set includes a plurality of sample images, region labeling information in the plurality of sample images, and key point labeling information in the plurality of sample images.

For example, a training set is preset, the training set includes a plurality of sample images, where each sample image includes a target to be recognized (e.g., a face), and each sample image is labeled with region labeling information and key point labeling information of each target. The sample images in the training set are input to the neural network for processing to obtain a target recognition result of the sample images; and a parameter of the neural network is adjusted according to a difference between the recognition result and the labeling information. After a plurality of iterations are performed, a trained neural network is obtained.

In one possible implementation, the step of training the neural network according to the preset training set includes:

processing the sample images via the feature extraction network to determine a first sample feature map;

processing the first sample feature map via the region prediction network to determine a second sample feature map and at least one sample region in the second sample feature map;

processing the first sample feature map via the key point detection network to determine a third sample feature map, where a width and a height of the third sample feature map are identical to a width and a height of the second sample feature map;

determining sample key point information in the sample region of the third sample feature map according to the at least one sample region;

determining a first labeling feature map of the sample images according to the region labeling information of the sample images, where a scale of the first labeling feature map is identical to a scale of the second sample feature map, and a channel number of the first labeling feature map represents a scale of the region labeling information;

determining a first loss of the sample images for the region prediction network according to a difference between the first labeling feature map and the second sample feature map;

determining a second loss of the sample images for the key point detection network according to a difference between the key point labeling information and the sample key point information; and training the neural network according to the first loss and the second loss of the plurality of sample images.

For example, for any one sample image in the training set, similar to the processing process in FIG. 3, the sample image is input to the feature extraction network for processing, and a first sample feature map is output, so as to reduce the scale of the image. Then the first sample feature map is input to the region prediction network for processing to obtain a second sample feature map and at least one sample region (i.e., the region suggestion box) in the second sample feature map. The scale of the second sample feature map is H×W×K, and G is, for example, 60.

In one possible implementation, a first labeling feature map M of the sample image is determined according to the region labeling information (i.e., the labeling box) of the sample image, where a scale of the first labeling feature map is identical to a scale of the second sample feature map, i.e., H×W×K, and a channel number of the first labeling feature map represents a scale of the region labeling information. That is to say, for any one label box $R_0$, $[x_0, y_0, h_0, w_0]$ of the sample image, $(x_0, y_0)$ represents the coordinates of the center point in the sample image, $h_0$ and $w_0$ represent the length and the width, and a scale code thereof is represented as:

$$b = 10 \times \left( \log_2 \frac{\max(b_0, w_0) \times 2048}{I_{max}} - 5 \right) \quad (7)$$

In formula (7), b represents the channel index (i.e., the channel number) of the label box $R_0$, and $I_{max}$ represents the longest edge of the sample image. It should be understood that a person skilled in the art may set the channel index of the label box $R_0$ according to actual situations, and no limitation is made thereto in the present disclosure.

In this situation, a value is assigned to each feature point in the first labeling feature map M. First, 1 is assigned to the center feature point of the label box $R_0$:

$$M\left(\left\lfloor \frac{x_0}{N_G} \right\rfloor, \left\lfloor \frac{y_0}{N_G} \right\rfloor, b\right) = 1 \quad (8)$$

In formula (8), NG represents the down-sampling multiple of the first labeling feature map with respect to the sample image.

In one possible implementation, in order to reduce the difficulty of learning a discrete value via a network, a 2D Gaussian function is introduced to adjust the value of a neighboring point of the center feature point in the first labeling feature map M. Assuming $$r = \left\lfloor \frac{b}{10} \right\rfloor,$$

where $\lfloor * \rfloor$ represents taking an integer, the following formula is provided:

$$M(x_u, y_u, b) = e^{-\frac{\left(\frac{x_u - x_h}{r}\right)^2 + \left(\frac{y_u - y_h}{r}\right)^2}{2\sigma^2}} \quad (9)$$

In formula (9), $$(x_h, y_h) = \left(\left\lfloor \frac{x_0}{N_G} \right\rfloor, \left\lfloor \frac{y_0}{N_G} \right\rfloor\right)$$

represents coordinates of the center feature point of the label box $R_0$, $(x_u, y_u)$ represents the neighboring point of the center feature point, and σ represents a preset variance. After a value is assigned to the feature point in each label box in the first labeling feature map M in formulas (8) and (9), the first labeling feature map M after assignment is obtained.

In this situation, a first loss of the sample images for the region prediction network is determined according to a difference between the first labeling feature map and the second sample feature map:

$$L_{scale} = -\frac{1}{|M_0|} \Sigma_t (p_t \log \hat{p}_t + (1 - p_t) \log(1 - \hat{p}_t)) \quad (10)$$

In formula (10), $|M_0|$ represents the number of feature points in the first labeling feature map and the second sample feature point; for any one feature point t, $p_t$ represents the value (as a supervision value) of the feature point t in the first labeling feature map, and $\hat{p}_t$ represents the value (i.e., a network prediction value) of the feature point t in the second sample feature map. In formula (10), a first loss $L_{scale}$ of the sample image for the region prediction network is calculated. Then, calculation is performed on the plurality of sample images (for example, 256 samples of one batch) respectively so as to obtain the first losses of the plurality of sample images, so that the neural network according to the embodiments of the present disclosure is trained. It should be understood that a person skilled in the art may set a loss function of the first loss according to actual situations, and no limitation is made thereto in the present disclosure.

In one possible implementation, for the second sample feature map of the sample images, a plurality of center points are determined from the second sample feature map according to a preset threshold (e.g., the first threshold); and according to the channel where the center feature points are located, the scales of the regions where the center feature points are located are calculated by using formula (7), so as to determine at least one sample region (i.e., the region suggestion box) in the second sample feature map.

In one possible implementation, the first sample feature map is input to the key point detection network for processing to obtain the third sample feature map, where the width and the height of the third sample feature map are identical to the height and the width of the second sample feature map, the scale of the third sample feature map is represented as H×W×G, the number of channels, K, is used for represent the number of key points of each target, and the number of channels, K, may be, for example, 5.

In one possible implementation, sample key point information in the sample region of the third sample feature map is determined according to each sample region. That is, the each sample region is normalized by using formula (1), and the position of the sample key point in the each sample region is determined by using formula (2). Then, a second loss of the sample images for the key point detection network is determined according to a difference between the key point labeling information of the sample images and the sample key point information thereof:

$$L_{keypoint} = \frac{1}{2K} \sum_{c=1}^{K} \|\Psi_{c,*} - \mathcal{G}_{c,*}\|_2^2 \qquad (11)$$

In formula (11), $\mathcal{G}_{c,*}$ represents a labeling key point (e.g., a key point for GT labeling), $\Psi_{c,*}$ represents a sample key point, and c represents a channel number. In formula (11), a second loss $L_{keypoint}$ of the sample image for the key point detection network is calculated. Then, calculation is performed respectively on the plurality of sample images (for example, 256 samples of one batch) so as to obtain the second losses of the plurality of sample images, so that the neural network according to the embodiments of the present disclosure is trained. It should be understood that a person skilled in the art may set a loss function of the second loss according to actual situations, and no limitation is made thereto in the present disclosure.

In one possible implementation, a total loss of the neural network is determined according to the first loss and the second loss of the plurality of sample images, for example, a weighted sum of the first loss and the second loss is determined as the total loss of the neural network. According to the total loss of the neural network, a network parameter of the neural network is adjusted by means of back propagation. After multiple iterations of adjustment are performed, in a situation that a preset training condition (e.g., network convergence) is satisfied, a trained neural network is obtained, and the entire training process is completed.

In this way, the process for training a neural network is implemented, and a high-precision neural network is obtained.

According to the image processing method of the embodiments of the present disclosure, a highly-efficient reasoning speed is achieved by using a low-scale image input and a lightweight model structure. Target position and scale prediction is implemented by using a target scale code and a convolutional neural network. The method uses an anchor-free mechanism, and in combination with face scale prediction and a derivable soft-argmax operation, a quick and accurate target detection algorithm is constructed.

According to the image processing method of the embodiments of the present disclosure, a bottom-up mechanism is used, i.e., face detection point detection is first carried out, and then a face bounding box is obtained by regression based on key point information. Compared to fuzzy definition of a face bounding box, face key points have an accurate semantic information expression, so that the reasoning precision is improved, and the performance may reach a SOTA (the current best series of algorithms) level.

The image processing method of the embodiments of the present disclosure is applicable to fields such as access control gates, intelligent video analysis, and security monitoring, and can implement quick and accurate face detection, face key point detection, or can jointly implement face key point detection and face bounding box detection.

Moreover, a potential face target scale in an image may be predicted by using a scale prediction result in the present method.

It may be understood that the foregoing method embodiments mentioned in the present disclosure may be combined with each other to obtain a combined embodiment without departing from the principle and the logic. Details are not described in the present disclosure again due to space limitation. A person skilled in the art may understand that, in the foregoing method in specific implementations, a specific execution sequence of the steps should be determined based on functions and possible internal logics of the steps.

In addition, the present disclosure further provides an image processing apparatus, an electronic device, a computer-readable storage medium, and a program. The foregoing are all configured to implement any image processing method provided in the present disclosure. For corresponding technical solutions and descriptions, refer to corresponding descriptions of the method. Details are not described again.

Figure 4:
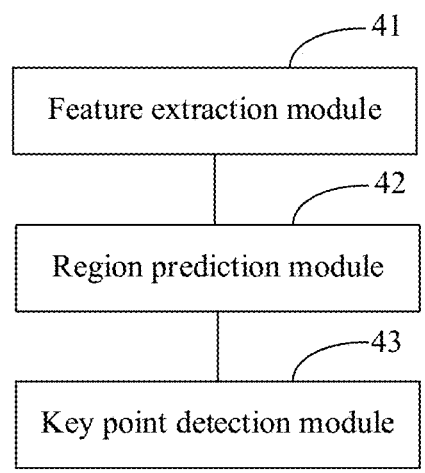
FIG. 4 shows a block diagram of an image processing apparatus according to embodiments of the present disclosure.

FIG. 4 shows a block diagram of an image processing apparatus according to embodiments of the present disclosure. As shown in FIG. 4, the apparatus includes:

a feature extraction module 41, configured to perform feature extraction on a to-be-processed image to obtain a first feature map of the to-be-processed image; a region prediction module 42, configured to perform target region prediction on the first feature map to determine a first region where a target is located in the first feature map; and a key point detection module 43, configured to perform key point detection on the first feature map according to the first region to determine target key point information of the to-be-processed image.

In one possible implementation, the apparatus further includes: a bounding box regression module, configured to perform bounding box regression on the target key point information of each target in the to-be-processed image respectively to determine a second region of the each target; and a result determination module, configured to determine a target recognition result of the to-be-processed image according to the second region of the each target.

In one possible implementation, the region prediction module includes: a center point feature extraction submodule, configured to perform center point feature extraction on the first feature map to obtain a second feature map;

a center point determination sub-module, configured to determine at least one region center point from a plurality of feature points of the second feature map, where the region center point includes a feature point having a feature value greater than or equal to a first threshold; a scale determination sub-module, configured to determine a scale of the first region corresponding to each region center point according to a channel number corresponding to the each region center point in the at least one region center point; and a region determination sub-module, configured determine each first region respectively according to a position of the each region center point and the scale of the first region corresponding to the each region center point.

In one possible implementation, the key point detection module includes: a key point feature extraction sub-module, configured to perform key point feature extraction on the first feature map to obtain a third feature map; a key point determination sub-module, configured to determine a plurality of key points of the target from a feature region corresponding to the first region in the third feature map; and a key point information determining sub-module, configured to determine the target key point information of the to-be-processed image according to positions of the plurality of key points in the third feature map.

In one possible implementation, the key point determination sub-module is configured to perform key point detection on channels of the feature region respectively to obtain key points corresponding to the channels.

In one possible implementation, the result determination module includes: a first score determination sub-module, configured to determine a first confidence score of the first region corresponding to the second region, and a second confidence score of all or part of the target key point information of the second region; a second score determination sub-module, configured to determine a third confidence score of the second region according to the first confidence score and the second confidence score; and a result determination sub-module, configured to determine the target recognition result of the to-be-processed image according to the third confidence score of each second region, where the target recognition result includes the second region having the third confidence score greater than or equal to a second threshold.

In one possible implementation, the apparatus is implemented via a neural network, and the apparatus further includes: a training module, configured to train the neural network according to a preset training set, where the training set includes a plurality of sample images, region labeling information in the plurality of sample images, and key point labeling information in the plurality of sample images.

In one possible implementation, the neural network includes a feature extraction network, a region prediction network, and a key point detection network, and the training module is configured to:

process the sample images via the feature extraction network to determine a first sample feature map; process the first sample feature map via the region prediction network to determine a second sample feature map and at least one sample region in the second sample feature map; process the first sample feature map via the key point detection network to determine a third sample feature map, where a width and a height of the third sample feature map are identical to a width and a height of the second sample feature map; determine sample key point information in the sample region of the third sample feature map according to the at least one sample region; determine a first labeling feature map of the sample images according to the region labeling information of the sample images, where a scale of the first labeling feature map is identical to a scale of the second sample feature map, and a channel number of the first labeling feature map represents a scale of the region labeling information; determine a first loss of the sample images for the region prediction network according to a difference between the first labeling feature map and the second sample feature map; determine a second loss of the sample images for the key point detection network according to a difference between the key point labeling information and the sample key point information; and train the neural network according to the first loss and the second loss of the plurality of sample images.

In one possible implementation, the target in the to-be-processed image includes any one of a face, a body, or hands.

In some embodiments, functions provided by or modules included in the apparatus provided in the embodiments of the present disclosure may be used to perform the method described in the foregoing method embodiments. For specific implementations thereof, reference may be made to descriptions of the foregoing method embodiments. For brevity, details are not described herein again.

The embodiments of the present disclosure further provide a computer-readable storage medium, having computer program instructions stored thereon, where when the computer program instructions are executed by a processor, the foregoing method is implemented. The computer-readable storage medium may be a non-volatile computer-readable storage medium or a volatile computer-readable storage medium.

The embodiments of the present disclosure further provide an electronic device, including a processor; and a memory configured to store processor-executable instructions, where the processor is configured to invoke the instructions stored in the memory to implement the foregoing method.

The embodiments of the present disclosure further provide a computer program product, including a computer-readable code, where when the computer-readable code runs in a device, the processor in the device executes instructions for implementing the image processing method according to any one of the foregoing embodiments.

The embodiments of the present disclosure further provide a computer program product, configured to store computer-readable instructions, where when the instructions are executed, a computer performs the operations of the image processing method according to any one of the foregoing embodiments.

The electronic device may be provided as a terminal, a server, or a device in another form.

Figure 5:
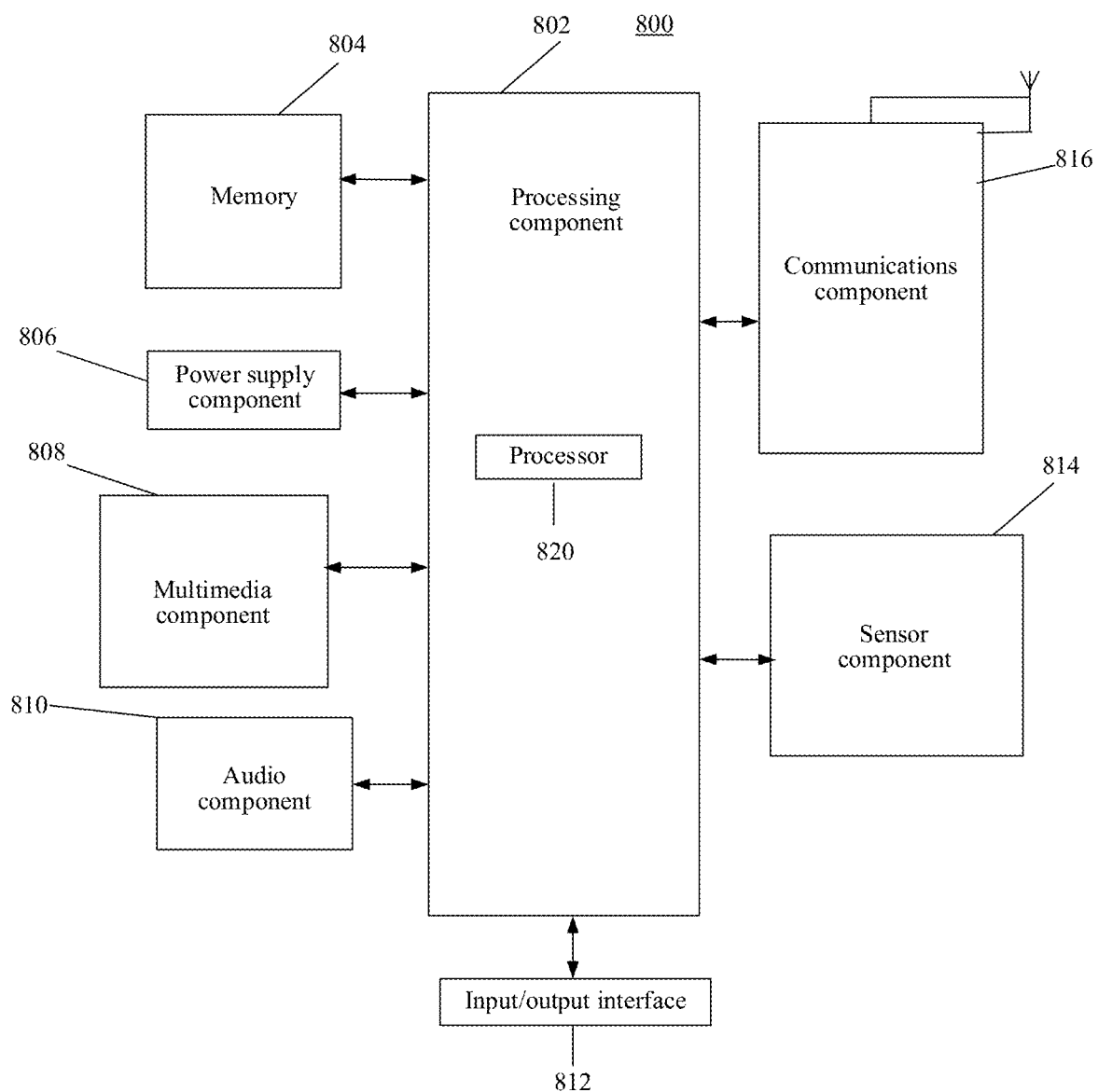
FIG. 5 shows a block diagram of an electronic device according to embodiments of the present disclosure.

FIG. 5 is a block diagram of an electronic device 800 according to embodiments of the present disclosure. For example, the electronic device 800 may be a terminal such as a mobile phone, a computer, a digital broadcast terminal, a message transceiver device, a game console, a tablet device, a medical device, a fitness device, or a personal digital assistant.

Referring to FIG. 5, the electronic device 800 may include one or more of the following components: a processing component 802, a memory 804, a power supply component 806, a multimedia component 808, an audio component 810, an Input/Output (I/O) interface 812, a sensor component 814, and a communications component 816.

The processing component 802 usually controls an overall operation of the electronic device 800, such as operations associated with display, a telephone call, data communication, a camera operation, or a recording operation. The processing component 802 may include one or more processors 820 to execute instructions, to complete all or some of the steps of the foregoing method. In addition, the processing component 802 may include one or more modules, facilitating interaction between the processing component 802 and other components. For example, the processing component 802 may include a multimedia module, facilitating interaction between the multimedia component 808 and the processing component 802.

The memory 804 is configured to store various types of data to support an operation on the electronic device 800. For example, the data includes instructions, contact data, phone book data, a message, an image, or a video of any application program or method that is operated on the electronic device 800. The memory 804 may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power supply component 806 supplies power to various components of the electronic device 800. The power supply component 806 may include a power management system, one or more power supplies, and other components associated with power generation, management, and allocation for the electronic device 800.

The multimedia component 808 includes a screen that provides an output interface and is between the electronic device 800 and a user. In some embodiments, the screen may include a Liquid Crystal Display (LCD) and a Touch Panel (TP). If the screen includes the touch panel, the screen may be implemented as a touchscreen, to receive an input signal from the user. The touch panel includes one or more touch sensors to sense a touch, a slide, and a gesture on the touch panel. The touch sensor may not only sense a boundary of a touch operation or a slide operation, but also detect duration and pressure related to the touch operation or the slide operation. In some embodiments, the multimedia component 808 includes a front-facing camera and/or a rear-facing camera. When the electronic device 800 is in an operation mode, for example, a photographing mode or a video mode, the front-facing camera and/or the rear-facing camera may receive external multimedia data. Each of the front-facing camera and the rear-facing camera may be a fixed optical lens system that has a focal length and an optical zoom capability.

The audio component 810 is configured to output and/or input an audio signal. For example, the audio component 810 includes one microphone (MIC). When the electronic device 800 is in an operation mode, such as a call mode, a recording mode, or a voice recognition mode, the microphone is configured to receive an external audio signal. The received audio signal may be further stored in the memory 804 or sent by using the communications component 816. In some embodiments, the audio component 810 further includes a speaker, configured to output an audio signal.

The I/O interface 812 provides an interface between the processing component 802 and a peripheral interface module, and the peripheral interface module may be a keyboard, a click wheel, a button, or the like. These buttons may include, but are not limited to, a home button, a volume button, a startup button, and a lock button.

The sensor component 814 includes one or more sensors, and is configured to provide status evaluation in various aspects for the electronic device 800. For example, the sensor component 814 may detect an on/off state of the electronic device 800 and relative positioning of components, and the components are, for example, a display and a keypad of the electronic device 800. The sensor component 814 may also detect a location change of the electronic device 800 or a component of the electronic device 800, existence or nonexistence of contact between the user and the electronic device 800, an orientation or acceleration/deceleration of the electronic device 800, and a temperature change of the electronic device 800. The sensor component 814 may include a proximity sensor, configured to detect existence of a nearby object when there is no physical contact. The sensor component 814 may further include an optical sensor, such as a CMOS or CCD image sensor, configured for use in imaging application. In some embodiments, the sensor component 814 may further include an acceleration sensor, a gyro sensor, a magnetic sensor, a pressure sensor, or a temperature sensor.

The communications component 816 is configured for wired or wireless communication between the electronic device 800 and other devices. The electronic device 800 may be connected to a communication-standard-based wireless network, such as Wi-Fi, 2G or 3G, or a combination thereof. In an exemplary embodiment, the communications component 816 receives a broadcast signal or broadcast-related information from an external broadcast management system via a broadcast channel. In an exemplary embodiment, the communications component 816 further includes a Near Field Communication (NFC) module, to facilitate short-range communication. For example, the NFC module is implemented based on a Radio Frequency Identification (RFID) technology, an Infrared Data Association (IrDA) technology, an Ultra Wideband (UWB) technology, a Bluetooth (BT) technology, and other technologies.

In an exemplary embodiment, the electronic device 800 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and is configured to implement the foregoing method.

In an exemplary embodiment, further provided is a non-volatile computer-readable storage medium, for example, the memory 804 including computer program instructions, where the computer program instructions may be executed by the processor 820 of the electronic device 800 to complete the foregoing method.

Figure 6:
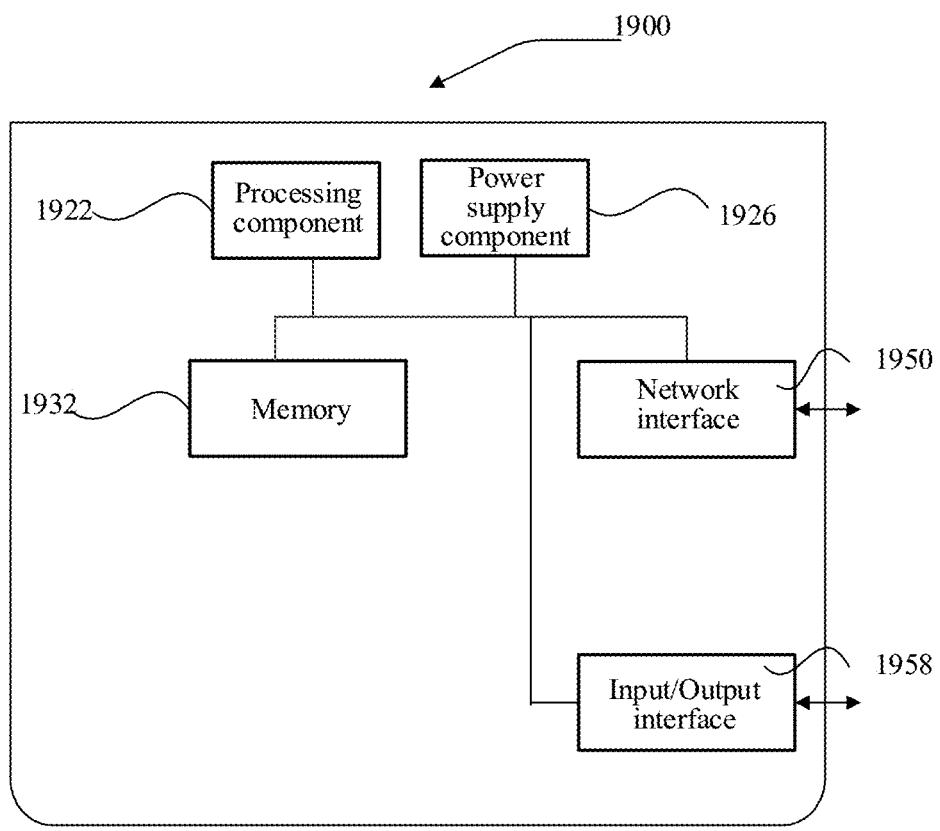
FIG. 6 shows a block diagram of an electronic device according to embodiments of the present disclosure.

FIG. 6 is a block diagram of an electronic device 1900 according to embodiments of the present disclosure. For example, the electronic device 1900 may be provided as a server. Referring to FIG. 6, the electronic device 1900 includes a processing component 1922 that further includes one or more processors; and a memory resource represented by a memory 1932, configured to store instructions, for example, an application program, that may be executed by the processing component 1922. The application program stored in the memory 1932 may include one or more modules each corresponding to a set of instructions. In addition, the processing component 1922 is configured to execute the instructions to implement the foregoing method.

The electronic device 1900 may further include: a power supply component 1926, configured to perform power management of the electronic device 1900; a wired or wireless network interface 1950, configured to connect the electronic device 1900 to a network; and an Input/Output (I/O) interface 1958. The electronic device 1900 may operate an operating system stored in the memory 1932, such as Windows Server™, Mac OS X™, Unix™, Linux™, FreeBSD™ or the like.

In an exemplary embodiment, further provided is a non-volatile computer-readable storage medium, for example, the memory 1932 including computer program instructions, where the computer program instructions may be executed by the processing component 1922 of the electronic device 1900 to complete the foregoing method.

The present disclosure may be a system, a method, and/or a computer program product. The computer program product may include a computer-readable storage medium, and computer-readable program instructions that are used by the processor to implement various aspects of the present disclosure are loaded on the computer-readable storage medium.

The computer-readable storage medium may be a tangible device that can maintain and store instructions used by an instruction execution device. The computer-readable storage medium may be, but is not limited to, an electronic storage device, a magnetic storage device, an optical storage device, an electromagnetic storage device, a semiconductor storage device, or any suitable combination thereof. More specific examples (a non-exhaustive list) of the computer-readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing instructions or a protrusion structure in a groove, and any suitable combination thereof. The computer-readable storage medium used herein is not interpreted as an instantaneous signal such as a radio wave or another freely propagated electromagnetic wave, an electromagnetic wave propagated by a waveguide or another transmission medium (for example, an optical pulse transmitted by an optical fiber cable), or an electrical signal transmitted by a wire.

The computer-readable program instructions described herein may be downloaded from a computer-readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter or a network interface in each computing/processing device receives the computer-readable program instructions from the network, and forwards the computer-readable program instructions, so that the computer-readable program instructions are stored in a computer-readable storage medium in each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The program readable program instructions may be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any kind of network, including a Local Area Network (LAN) or a Wide Area Network (WAN), or may be connected to an external computer (for example, connected via the Internet with the aid of an Internet service provider). In some embodiments, an electronic circuit such as a programmable logic circuit, a Field Programmable Gate Array (FPGA), or a Programmable Logic Array (PLA) is personalized by using status information of the computer-readable program instructions, and the electronic circuit may execute the computer-readable program instructions so as to implement various aspects of the present disclosure.

Various aspects of the present disclosure are described herein with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams may be implemented by using the computer-readable program instructions.

These computer-readable program instructions may be provided for a general-purpose computer, a dedicated computer, or a processor of another programmable data processing apparatus so as to generate a machine, so that when the instructions are executed by the computer or the processor of the another programmable data processing apparatus, an apparatus for implementing a specified function/action in one or more blocks in the flowcharts and/or block diagrams is generated. These computer-readable program instructions may also be stored in a computer-readable storage medium, and these instructions may instruct a computer, a programmable data processing apparatus, and/or another device to work in a specific manner. Thus, the computer-readable storage medium storing the instructions includes an artifact, and the artifact includes instructions for implementing a specified function/action in one or more blocks in the flowcharts and/or block diagrams.

The computer-readable program instructions may be loaded onto a computer, another programmable data processing apparatus, or another device, so that a series of operations and steps are executed on the computer, the another programmable apparatus, or the another device, thereby generating computer-implemented processes. Thus, the instructions executed on the computer, the another programmable apparatus, or the another device implement a specified function/action in one or more blocks in the flowcharts and/or block diagrams.

The flowcharts and block diagrams in the accompanying drawings show possible architecture, functions, and operations of the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system that executes a specified function or action, or may be implemented by using a combination of dedicated hardware and a computer instruction.

The computer program product is specifically implemented by means of hardware, software, or a combination thereof. In one optional embodiment, the computer program product is specifically represented by a computer storage medium. In another optional embodiment, the computer program product is represented by a software product, such as Software Development Kit (SDK).

Different embodiments in the present disclosure may be mutually combined without violating logic. The different embodiments emphasize different aspects, and for a part not described in detail, reference may be made to descriptions of other embodiments.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terms selected herein are intended to best explain the principles of the embodiments, practical applications, or improvements to the technologies in the market, or to enable other persons of ordinary skill in the art to understand the embodiments disclosed herein.

The invention claimed is:

1. An image processing method, comprising:
performing feature extraction on a to-be-processed image to obtain a first feature map of the to-be-processed image;
performing target region prediction on the first feature map to determine a first region where a target is located in the first feature map, wherein the performing target region prediction on the first feature map to determine the first region where the target is located in the first feature map further comprises:
performing center point feature extraction on the first feature map to obtain a second feature map;
determining at least one region center point from a plurality of feature points of the second feature map, wherein the region center point comprises a feature point having a feature value greater than or equal to a first threshold;
determining a scale of the first region corresponding to each region center point according to a channel number corresponding to the each region center point in the at least one region center point; and
determining each first region respectively according to a position of the each region center point and the scale of the first region corresponding to the each region center point; and
performing key point detection on the first feature map according to the first region to determine target key point information of the to-be-processed image.

2. The method according to claim 1, further comprising:
performing bounding box regression on the target key point information of each target in the to-be-processed image respectively to determine a second region of the each target; and
determining a target recognition result of the to-be-processed image according to the second region of the each target.

3. The method according to claim 2, wherein determining the target recognition result of the to-be-processed image according to the second region of the each target comprises:
determining a first confidence score of the first region corresponding to the second region, and a second confidence score of all or part of the target key point information of the second region;
determining a third confidence score of the second region according to the first confidence score and the second confidence score; and
determining the target recognition result of the to-be-processed image according to the third confidence score of each second region, wherein the target recognition result comprises the second region having the third confidence score greater than or equal to a second threshold.

4. The method according to claim 1, wherein performing key point detection on the first feature map according to the first region to determine the target key point information of the to-be-processed image comprises:
performing key point feature extraction on the first feature map to obtain a third feature map;
determining a plurality of key points of the target from a feature region corresponding to the first region in the third feature map; and
determining the target key point information of the to-be-processed image according to positions of the plurality of key points in the third feature map.

5. The method according to claim 4, wherein determining the plurality of key points of the target from the feature region corresponding to the first region in the third feature map comprises:
performing key point detection on each channel of the feature region respectively to obtain key points corresponding to the each channel.

6. The method according to claim 1, wherein the method is implemented via a neural network, and the method further comprises:
training the neural network according to a preset training set, wherein the training set comprises a plurality of sample images, region labeling information in the plurality of sample images, and key point labeling information in the plurality of sample images.

7. The method according to claim 6, wherein the neural network comprises a feature extraction network, a region prediction network, and a key point detection network, and training the neural network according to the preset training set comprises:
processing the sample images via the feature extraction network to determine a first sample feature map;
processing the first sample feature map via the region prediction network to determine a second sample feature map and at least one sample region in the second sample feature map;
processing the first sample feature map via the key point detection network to determine a third sample feature map, wherein a width and a height of the third sample feature map are identical to a width and a height of the second sample feature map;
determining sample key point information in the sample region of the third sample feature map according to the at least one sample region;
determining a first labeling feature map of the sample images according to the region labeling information of the sample images, wherein a scale of the first labeling feature map are identical to a scale of the second sample feature map, and a channel number of the first labeling feature map represents a scale of the region labeling information;

determining a first loss of the sample images for the region prediction network according to a difference between the first labeling feature map and the second sample feature map;

determining a second loss of the sample images for the key point detection network according to a difference between the key point labeling information and the sample key point information; and training the neural network according to the first loss and the second loss of the plurality of sample images.

8. The method according to claim 1, wherein the target in the to-be-processed image comprises any one of a face, a body, or hands.

9. An image processing apparatus, comprising:
a processor; and
a memory configured to store processor-executable instructions,
wherein the processor is configured to invoke the instructions stored in the memory, to:
perform feature extraction on a to-be-processed image to obtain a first feature map of the to-be-processed image;
perform target region prediction on the first feature map to determine a first region where a target is located in the first feature map, wherein performing target region prediction on the first feature map to determine the first region where the target is located in the first feature map further comprises:
  performing center point feature extraction on the first feature map to obtain a second feature map;
  determining at least one region center point from a plurality of feature points of the second feature map, wherein the region center point comprises a feature point having a feature value greater than or equal to a first threshold;
  determining a scale of the first region corresponding to each region center point according to a channel number corresponding to the each region center point in the at least one region center point; and
  determining each first region respectively according to a position of the each region center point and the scale of the first region corresponding to the each region center point; and
perform key point detection on the first feature map according to the first region to determine target key point information of the to-be-processed image.

10. The apparatus according to claim 9, wherein the processor is further configured to:
perform bounding box regression on the target key point information of each target in the to-be-processed image respectively to determine a second region of the each target; and
determine a target recognition result of the to-be-processed image according to the second region of the each target.

11. The apparatus according to claim 10, wherein determining the target recognition result of the to-be-processed image according to the second region of the each target comprises:
determining a first confidence score of the first region corresponding to the second region, and a second confidence score of all or part of the target key point information of the second region;

determining a third confidence score of the second region according to the first confidence score and the second confidence score; and determining the target recognition result of the to-be-processed image according to the third confidence score of each second region, wherein the target recognition result comprises the second region having the third confidence score greater than or equal to a second threshold.

12. The apparatus according to claim 9, wherein performing key point detection on the first feature map according to the first region to determine the target key point information of the to-be-processed image comprises:
performing key point feature extraction on the first feature map to obtain a third feature map;
determining a plurality of key points of the target from a feature region corresponding to the first region in the third feature map; and
determining the target key point information of the to-be-processed image according to positions of the plurality of key points in the third feature map.

13. The apparatus according to claim 12, wherein determining the plurality of key points of the target from the feature region corresponding to the first region in the third feature map comprises:
performing key point detection on each channel of the feature region respectively to obtain key points corresponding to the each channel.

14. The apparatus according to claim 9, wherein the processor is further configured to:
train a neural network according to a preset training set, wherein the training set comprises a plurality of sample images, region labeling information in the plurality of sample images, and key point labeling information in the plurality of sample images.

15. The apparatus according to claim 14, wherein the neural network comprises a feature extraction network, a region prediction network, and a key point detection network, and
training the neural network according to the preset training set comprises:
processing the sample images via the feature extraction network to determine a first sample feature map;
processing the first sample feature map via the region prediction network to determine a second sample feature map and at least one sample region in the second sample feature map;
processing the first sample feature map via the key point detection network to determine a third sample feature map, wherein a width and a height of the third sample feature map are identical to a width and a height of the second sample feature map;
determining sample key point information in the sample region of the third sample feature map according to the at least one sample region;
determining a first labeling feature map of the sample images according to the region labeling information of the sample images, wherein a scale of the first labeling feature map are identical to a scale of the second sample feature map, and a channel number of the first labeling feature map represents a scale of the region labeling information;
determining a first loss of the sample images for the region prediction network according to a difference between the first labeling feature map and the second sample feature map;

determining a second loss of the sample images for the key point detection network according to a difference between the key point labeling information and the sample key point information; and training the neural network according to the first loss and the second loss of the plurality of sample images.

16. The apparatus according to claim 9, wherein the target in the to-be-processed image comprises any one of a face, a body, or hands.

17. A non-transitory computer-readable storage medium, having computer program instructions stored thereon, wherein when the computer program instructions are executed by a processor, the processor is caused to perform operations comprising:

performing feature extraction on a to-be-processed image to obtain a first feature map of the to-be-processed image;

performing target region prediction on the first feature map to determine a first region where a target is located in the first feature map, wherein the performing target region prediction on the first feature map to determine the first region where the target is located in the first feature map further comprises:

performing center point feature extraction on the first feature map to obtain a second feature map;

determining at least one region center point from a plurality of feature points of the second feature map, wherein the region center point comprises a feature point having a feature value greater than or equal to a first threshold;

determining a scale of the first region corresponding to each region center point according to a channel number corresponding to the each region center point in the at least one region center point; and determining each first region respectively according to a position of the each region center point and the scale of the first region corresponding to the each region center point; and performing key point detection on the first feature map according to the first region to determine target key point information of the to-be-processed image.

18. The non-transitory computer-readable storage medium according to claim 17, wherein when the computer program instructions are executed by a processor, the processor is further caused to perform the operations of:

performing bounding box regression on the target key point information of each target in the to-be-processed image respectively to determine a second region of the each target; and determining a target recognition result of the to-be-processed image according to the second region of the each target.

19. The non-transitory computer-readable storage medium according to claim 17, wherein the performing key point detection on the first feature map according to the first region to determine the target key point information of the to-be-processed image comprises:

performing key point feature extraction on the first feature map to obtain a third feature map;

determining a plurality of key points of the target from a feature region corresponding to the first region in the third feature map; and determining the target key point information of the to-be-processed image according to positions of the plurality of key points in the third feature map.

20. The non-transitory computer-readable storage medium according to claim 17, wherein the operations are implemented via a neural network, and when the computer program instructions are executed by the processor, the processor is further caused to perform the operations further comprising:

training the neural network according to a preset training set, wherein the training set comprises a plurality of sample images, region labeling information in the plurality of sample images, and key point labeling information in the plurality of sample images.

\* \* \* \* \*